(12) United States Patent
Barmeier et al.

(10) Patent No.: US 11,149,591 B2
(45) Date of Patent: Oct. 19, 2021

(54) HEAT ACCUMULATOR COMPRISING A DIFFUSER PORTION

(71) Applicant: Siemens Gamesa Renewable Energy A/S, Brande (DK)

(72) Inventors: Till Andreas Barmeier, Hamburg (DE); Vladimir Danov, Erlangen (DE); Dirk Koschnitzke, Könnern (DE); Theodoros Papadopoulos, Munich (DE); Victor Ustinov, Fuerth (DE)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 15/104,608

(22) PCT Filed: Jan. 16, 2014

(86) PCT No.: PCT/EP2014/050821
§ 371 (c)(1),
(2) Date: Jun. 15, 2016

(87) PCT Pub. No.: WO2015/106815
PCT Pub. Date: Jul. 23, 2015

(65) Prior Publication Data
US 2016/0312663 A1   Oct. 27, 2016

(51) Int. Cl.
*F28D 20/00*  (2006.01)
*F01K 3/00*   (2006.01)
*F28F 9/02*   (2006.01)

(52) U.S. Cl.
CPC ............ *F01K 3/00* (2013.01); *F28D 20/0056* (2013.01); *F28F 2009/029* (2013.01); *Y02E 60/14* (2013.01)

(58) Field of Classification Search
CPC ............ F28D 20/00; F28D 2020/0004; F28D 20/0056; F28D 2020/0069;
(Continued)

(56) References Cited

U.S. PATENT DOCUMENTS

| | | | | |
|---|---|---|---|---|
| 2,933,885 A | * | 4/1960 | Vago | F01K 3/00 122/35 |
| 5,110,560 A | * | 5/1992 | Presz, Jr. | F15D 1/001 422/176 |

(Continued)

FOREIGN PATENT DOCUMENTS

| | | |
|---|---|---|
| CN | 101147039 A | 3/2008 |
| CN | 102257344 A | 11/2011 |

(Continued)

OTHER PUBLICATIONS

Non-English European Exam Report for Application No. 14 700 879.1, dated Oct. 4, 2018.
(Continued)

*Primary Examiner* — Harry E Arant
(74) *Attorney, Agent, or Firm* — Schmeiser, Olsen & Watts LLP

(57) ABSTRACT

A heat reservoir including a housing, first reservoir elements for storing thermal energy, and an inlet port is provided. The first reservoir elements are arranged in the housing. The inlet port is coupled to the housing in such a way that a working fluid can flow into the housing through the inlet port. The inlet port is provided with an inlet orifice through which the working fluid can flow from the surroundings of the heat reservoir into the inlet port. The inlet port includes a diffusor portion the cross-section of which increases in the direction running from the inlet orifice to the housing.

13 Claims, 2 Drawing Sheets

(58) Field of Classification Search
CPC ..... F28D 2020/0082; F28D 2020/0017; F28D 2020/0026; F28D 17/00; F28D 17/005; F28D 9/02; Y02E 60/142; Y02E 60/14; F01K 3/00; F28F 2009/029
See application file for complete search history.

(56) References Cited

U.S. PATENT DOCUMENTS

| | | | | |
|---|---|---|---|---|
| 5,165,452 | A | * | 11/1992 | Cheng ............... F24F 13/06 138/37 |
| 5,408,828 | A | * | 4/1995 | Kreucher ............ F01N 3/2892 60/299 |
| 7,462,332 | B2 | * | 12/2008 | Hardesty ............ F01N 3/2853 422/177 |
| 2008/0190592 | A1 | | 8/2008 | Bruck et al. |
| 2009/0250189 | A1 | | 10/2009 | Soukhojak et al. |
| 2009/0277603 | A1 | | 11/2009 | Yang |
| 2012/0312496 | A1 | * | 12/2012 | Howes ................ F01K 3/12 165/7 |
| 2013/0240171 | A1 | * | 9/2013 | Morgan ............. F28D 20/00 165/10 |
| 2014/0014290 | A1 | * | 1/2014 | Howes ............ F28D 20/0056 165/10 |
| 2014/0352912 | A1 | | 12/2014 | Francy |

FOREIGN PATENT DOCUMENTS

| | | | |
|---|---|---|---|
| CN | 102869854 | A | 1/2013 |
| CN | 104136875 | A | 11/2014 |
| EP | 2539549 | A2 | 1/2013 |
| JP | S5944589 | A * | 3/1984 |
| RU | 2032812 | C1 * | 4/1995 |
| WO | 2012017041 | A2 | 2/2012 |
| WO | WO2012127178 | A1 | 9/2012 |
| WO | WO2013093819 | A2 | 6/2013 |

OTHER PUBLICATIONS

Chinese language Office Action for Chinese Application No. 201480073338.8, dated Jun. 13, 2017.
International Search Report; PCT/EP2014/050821; International Filing Date: Jan. 16, 2014; 2 pgs.

* cited by examiner

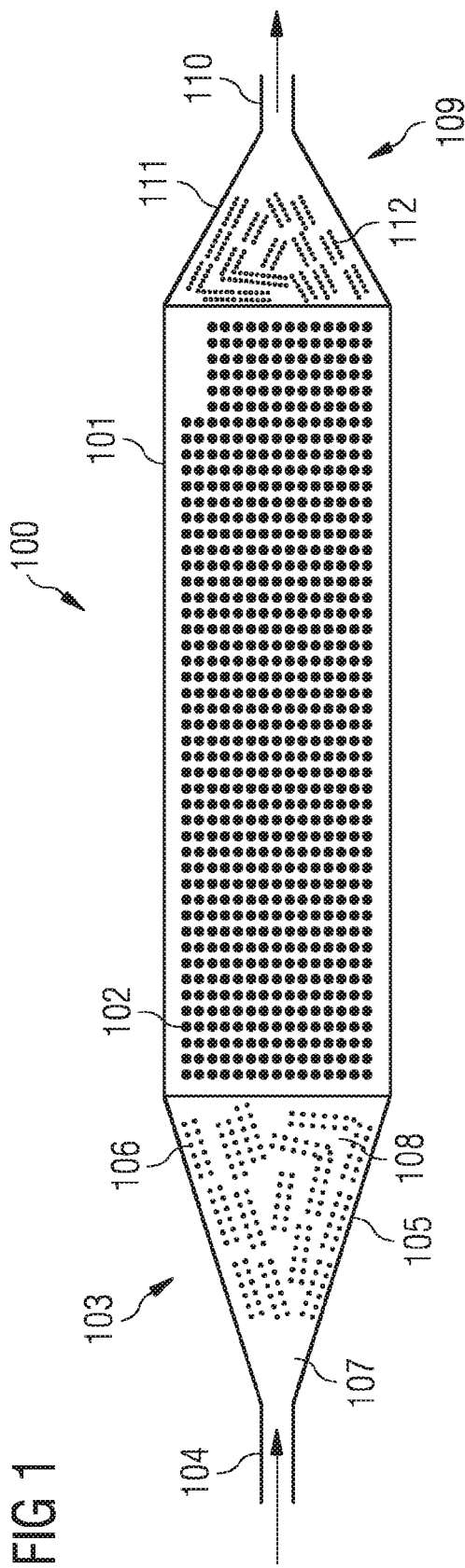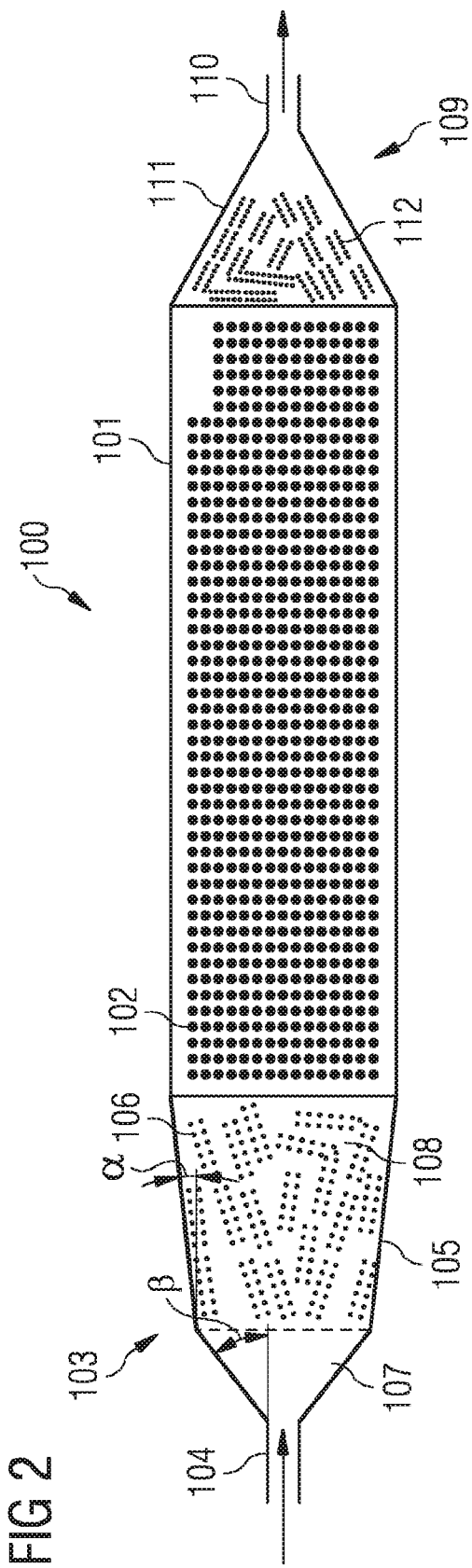

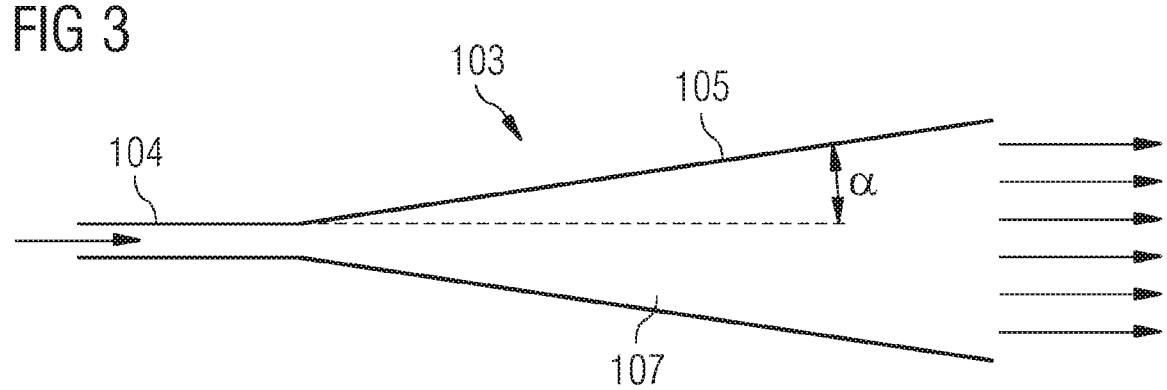

HEAT ACCUMULATOR COMPRISING A DIFFUSER PORTION

CROSS-REFERENCE TO RELATED APPLICATIONS

This application claims priority to PCT Application No. PCT/EP2014/050821, having a filing date of Jan. 16, 2014, the entire contents of which are hereby incorporated by reference.

FIELD OF TECHNOLOGY

The following invention relates to a heat accumulator and to a steam power plant. Embodiments of the present invention also relate to a method for storing thermal energy.

BACKGROUND

Modern steam power plants generally have an evaporator, which is fed thermal energy in order to vaporize a working fluid, usually water. The vaporized water is subsequently fed to a steam turbine, which drives an electrical generator for generating electrical energy.

Especially when using renewable energy sources, such as for example solar energy, at certain times of day thermal or electrical energy is generated even though the demand for electrical energy at this time is low. In order for the thermal or electrical energy that is not used not to be wasted, heat accumulators are used.

Heat accumulators generally have a housing, in which storage elements are arranged in order to store thermal energy. If at one time electricity is being generated although there is no demand, or scarcely any demand, for electrical energy, the electricity can be converted into a hot working fluid and fed to the heat accumulator, in order to heat up the storage elements present in it. At a later time, at which scarcely any thermal energy is being generated but the demand for electrical energy is high, a cool working fluid is fed to the heat accumulator and heated, so that subsequently the heated working fluid is fed to the steam turbine or a heat exchanger, with which a working fluid of the steam turbine can be heated, and this working fluid drives the electrical generator for generating electrical energy.

In order to make a heat accumulator efficient, when heating the storage elements or when heating the working medium the working medium must flow around the storage elements uniformly with a low flow rate, in order in this way to provide an efficient thermal exchange between the working fluid and the storage elements.

In order that the working medium is distributed uniformly and the working medium flows onto the storage elements uniformly, generally various deflecting and air-diverting baffles of a wide variety of geometries are used. However, such deflection of the working medium also leads to a pressure loss. Plates referred to as column trays, of a wide variety of types (bubble trays etc.), or columns with a packing are known for example from the process industry for uniformly distributing a working medium. Various types of perforated plates may also be used for example for distributing an air flow.

SUMMARY

An aspect relates to improving the flow distribution of a fluid in a heat accumulator.

A further aspect is achieved with a heat accumulator, a steam power plant and a method for storing energy according to the independent patent claims.

According to a first aspect of an embodiment of the present invention, a heat accumulator is described. The heat accumulator has a housing and first storage elements for storing thermal energy, the first storage elements being arranged in the housing. Furthermore, the heat accumulator has an inlet passage (or an inlet channel), which is coupled to the housing in such a way that a working fluid can flow into the housing through the inlet passage. The inlet passage has an inlet opening, through which the working fluid can flow into the inlet passage from an area surrounding the heat accumulator. The inlet passage has a diffuser portion, which has a flow cross section that becomes greater in a direction from the inlet opening to the housing.

According to a further aspect of an embodiment of the present invention, a steam power plant for generating electrical energy is described. The steam power plant has the aforementioned heat accumulator.

The steam power plant also has an evaporator, which is fed thermal energy (for example from solar thermal systems) in order to vaporize a working fluid, usually water. The vaporized water is subsequently fed to a steam turbine of the steam power plant, which drives an electrical generator for generating electrical energy. In order for the thermal energy that is not used not to be wasted, the steam power plant has the heat accumulator described above. The heat accumulator is in particular coupled with the evaporator of the steam power plant in order to obtain the heated-up working fluid for the heating. In addition, the heat accumulator is coupled with the steam turbine, in order to provide a heated-up working fluid for the steam turbine.

According to a further aspect of an embodiment of the present invention, a method for storing thermal energy is described. According to the method, a working fluid is made to flow through an inlet passage into a housing of a heat accumulator. The heat accumulator is formed in a way corresponding to the heat accumulator described above.

The housing is made from a temperature-resistant material (for example metal sheet or ceramic). The housing is for example cubically or cylindrically formed and has for example a circular, oval or polygonal base area. The housing may also be considered for example as a cuboidal formation. Depending on the design data, the housing may for example have a cross-sectional area or base area of approximately 10 m×10 m (meters) and more.

The inlet passage is of a heat-resistant form and for example likewise consists of a metal sheet. The inlet passage is for example detachably fastened to the housing or welded onto the housing. Furthermore, the inlet passage may be formed integrally and in one piece with the housing.

The inlet passage has for example an inlet opening, through which a working fluid, whether for heating the storage elements or for taking up heat from the storage elements, can flow from a feed line into the inlet passage or for example from the housing to the inlet opening. The feed line, and correspondingly the inlet passage in the region of the inlet opening, have for example a diameter of approximately 0.5 m to approximately 4 m, usually between approximately 1 m and 2 m (meters). As a result, the working fluid (steam or gas) must be distributed from a flow cross section in the region of the inlet opening of the inlet passage to a flow cross section of the housing, for example a flow cross section of approximately 10 m×10 m (or a diameter of approximately 8 m to 12 m). Other dimensions of the heat accumulator are likewise possible.

In order to distribute the working fluid constantly at the entry into the housing, the inlet passage has a diffuser portion, which has a flow cross section that becomes greater in the direction from the inlet opening to the housing. In this way, the flow rate of the working fluid is reduced and at the same time a constant distribution of the working fluid is achieved at the entry into the housing (i.e. at the transition between the inlet passage and the housing). The slower working fluid, for example, which has a constant distribution over the flow cross section in the housing, can take up or correspondingly give off thermal energy very efficiently when it subsequently flows around the storage elements. The use of the diffuser portion also has the effect that a smaller pressure loss can be achieved than in the case of conventional deflecting plates that may be arranged directly in the flow channel, while at the same time a uniform distribution of the working fluid is established.

The working fluid for heating up the storage elements may be water (in particular hot, superheated steam), air, nitrogen or argon. A working fluid, or further working fluid, that flows into the heat accumulator for heating purposes is for example water, which flows in for example in the liquid state, steam, air, nitrogen or argon.

In particular, the steam power plant described above may have a water/steam circuit or a gas/steam circuit, which are coupled with a heat exchanger with a working fluid circuit of the heat accumulator. This allows the heat accumulator to have a working fluid with a good thermal capacity, for example nitrogen or argon, in order in a heating-up mode to heat the storage elements of the heat accumulator or in a cooling-down mode to cool down the storage elements of the heat accumulator and correspondingly take up thermal energy. The working fluid can give off the thermal energy to the working medium of the steam power plant (usually water/steam) or correspondingly take up thermal energy by means of the heat exchanger.

As described further below, the storage elements, i.e. the first, second and/or third storage elements, consist of stones, in particular lava stones, ceramic elements, brick elements, granite or basalt. The storage elements are provided as bulk material and have a high thermal storage capacity.

The heat accumulator according to an embodiment of the invention consequently has a novel concept for working fluid distribution, in particular when the working fluid flows into the housing of the heat exchanger. This is achieved in particular by a diffuser portion being formed in the inlet passage. This allows a good distribution of the working fluid and at the same time a slowing of the working fluid to be set in a short diffuser portion of the inlet passage, without causing a pressure loss that is all that great. On account of this distribution of the working fluid and simultaneous reduction in the rate of the working fluid involving little loss of pressure, a good distributing effect of the working fluid is achieved with at the same time a small pressure loss. This leads in turn to an improved thermal interaction between the working fluid and the storage elements, so that the heat exchanger works more efficiently.

Furthermore, apart from being coupled with a steam power plant or the steam circuit thereof, the heat accumulator may also be coupled with other circuits and store or give off the heat of these circuits. For example, the heat accumulator may be coupled directly or indirectly by way of a heat exchanger with an ORC (Organic Rankine Cycle) circuit or a CO2 circuit.

According to a further embodiment given by way of example, the diffuser portion has a diffuser angle of (approximately) 45° to 60°, in particular 55°.

According to a further embodiment given by way of example, the heat accumulator has second storage elements for storing thermal energy, which are arranged in the inlet passage.

According to a further embodiment given by way of example, at least one of the second storage elements is arranged in the diffuser portion.

According to a further embodiment given by way of example, the diffuser portion has a first region and a second region, which is formed downstream of the first region along the direction from the inlet opening to the housing. The at least one second storage element is arranged in the second region and the first region is free from second storage elements.

The second storage elements, which are arranged in the inlet passage, in particular in a second region of the diffuser portion, may be arranged in a predetermined arrangement and alignment, and consequently serve as flow elements.

The first region of the diffuser portion does not have any second storage elements and serves exclusively for reducing the flow rate of the working fluid and for distributing the working fluid. The second storage elements in the second region serve additionally for distributing the flow of the working fluid. This combination of the first region and the second region of the diffuser portion produces a good combination of a distributing effect of the working fluid, a small pressure loss of the working fluid and a small volume of the inlet passage. As a result, the diffuser portion may for example have a much greater diffuser angle, for example approximately 45° to 80°, in particular up to 60°.

According to a further embodiment given by way of example, the heat accumulator has an outlet channel, which is coupled to the housing in such a way that the working fluid can flow out of the housing through the outlet channel. In this way, a circuit of the working fluid is formed in the heat accumulator, the working fluid flowing in through the inlet passage and, after flowing through the housing, flowing out through the outlet channel.

According to a further embodiment given by way of example, the outlet channel has an outlet opening, through which the working fluid can flow out of the housing out of the outlet channel. The outlet channel has a nozzle portion, which has a flow cross section that becomes smaller in a direction from the housing to the outlet opening.

By means of the nozzle portion, for example, the rate of the working fluid is again increased and likewise an increase in pressure is produced.

According to a further embodiment given by way of example, the heat accumulator has third storage elements for storing thermal energy, which are arranged in the outlet channel.

It is pointed out that the embodiments described here merely represent a limited selection of possible configurational variants of embodiments of the invention. Thus it is possible to combine the features of individual embodiments with one another in a suitable way, so that, with the configurational variants explicitly provided here, a large number of different embodiments can be regarded as disclosed in an obvious way for a person skilled in the art. In particular, some embodiments of the invention are described by device claims and other embodiments of the invention are described by method claims. When reading this application, it will however be immediately clear to a person skilled in the art that, unless otherwise explicitly stated, in addition to a combination of features that belong to one type of subject of embodiments the invention, any desired combination of features that belong to different types of subjects of embodiments the invention is also possible.

BRIEF DESCRIPTION

Some of the embodiments will be described in detail, with reference to the following figures, wherein like designations denote like members, wherein:

FIG. 1 shows a schematic representation of a heat accumulator;

FIG. 2 shows a schematic representation of a heat accumulator; and

FIG. 3 shows a schematic representation of an inlet passage.

DETAILED DESCRIPTION

In the figures, the same or similar components are provided with the same reference numerals. The representations in the figures are schematic and not to scale.

FIG. 1 shows a heat accumulator 100 according to an exemplary embodiment of the present invention. The heat accumulator 100 has a housing 101, first storage elements 102 for storing thermal energy and an inlet passage 103. The first storage elements 102 are arranged in the housing 101. The inlet passage 103 is coupled to the housing 101 in such a way that a working fluid can flow into the housing 101 through the inlet passage 103. The inlet passage 103 has an inlet opening 104, through which the working fluid can flow into the inlet passage 103 from an area surrounding the heat accumulator 100. The inlet passage 103 has a diffuser portion 105, which has a flow cross section that becomes greater in a direction from the inlet opening 104 to the housing 101.

The heat accumulator 100 shown in FIG. 1 can be used for example in a steam power plant for generating electrical energy.

The housing 101 is made for example from temperature-resistant metal sheet. The housing 101 is also cylindrically formed and has for example a circular, oval or polygonal base area.

The inlet passage 103 is of a heat-resistant form and for example likewise consists of a metal sheet. The inlet passage 103 is for example detachably fastened to the housing 101 or welded onto the housing 101. Furthermore, the inlet passage 103 may be formed integrally and in one piece with the housing 101.

The inlet passage 103 has for example the inlet opening 104, through which the working fluid, whether for heating the storage elements 102, 106, 112 or for taking up heat from the storage elements 102, 106, 112, can flow from a feed line into the inlet passage 103 or for example from the housing 101 to the inlet opening 104. As a result, the working fluid (steam or gas) must be distributed from a flow cross section in the region of the inlet opening 104 of the inlet passage 103 to a flow cross section of the housing 101, for example a flow cross section of approximately 10 m×10 m (or a diameter of approximately 8 m to 12 m).

In order to distribute the working fluid constantly at the entry into the housing 101, the inlet passage 103 has the diffuser portion 105, which has a flow cross section that becomes greater in the direction from the inlet opening 104 to the housing 101. In this way, the flow rate of the working fluid is reduced and at the same time a constant distribution of the working fluid is achieved at the entry into the housing 101 (i.e. at the transition between the inlet passage 103 and the housing 101). The slower working fluid, which has a constant distribution over the flow cross section in the housing 101, can take up or correspondingly give off thermal energy very efficiently when it subsequently flows around the storage elements 102, 106, 112. The use of the diffuser portion 105 also has the effect that a smaller pressure loss can be achieved, while at the same time a uniform distribution of the working fluid is established.

A homogeneous distribution of the working fluid and at the same time a slowing of the working fluid can be set in the short diffuser portion 105 of the inlet passage 103, without causing a pressure loss that is all that great.

The further second storage elements 106 for storing thermal energy are arranged in the inlet passage 103. As represented in FIG. 1, at least one of the second storage elements 106 or all of the second storage elements 106 is/are arranged in the diffuser portion 105.

In particular, the diffuser portion 105 has a first region 107 and a second region 108, which is formed downstream of the first region 107 along the direction from the inlet opening 104 to the housing 101. The direction is represented in FIG. 1 by the arrows shown there. The at least one second storage element 106 is arranged in the second region 108 and the first region 107 is free from second storage elements 106.

The second storage elements 106, which are arranged in the inlet passage 103, in particular in a second region 108 of the diffuser portion 105, may be arranged in a predetermined arrangement and alignment.

The first region 107 of the diffuser portion 105 does not have any second storage elements 106 and serves exclusively for reducing the flow rate of the working fluid and for distributing the working fluid. The second storage elements 106 in the second region 108 serve additionally for distributing the flow of the working fluid. This combination of the first region 107 and the second region 108 of the diffuser portion 105 produces a good combination of a distributing effect of the working fluid, a small pressure loss of the working fluid and a small volume of the inlet passage 103.

The heat accumulator 100 also has an outlet channel 109, which is coupled to the housing 101 in such a way that the working fluid can flow out of the housing 101 through the outlet channel 109. In this way, a circuit of the working fluid is formed in the heat accumulator 100, the working fluid flowing in through the inlet passage 103 and, after flowing through the housing 101, flowing out through the outlet channel 109.

The outlet channel 109 has an outlet opening 110, through which the working fluid can flow out of the housing 101 from the outlet channel 109. The outlet channel 109 has a nozzle portion 111, which has a flow cross section that becomes smaller in a direction (see arrows) from the housing 101 to the outlet opening 110.

By means of the nozzle portion 111, for example, the rate of the working fluid is again increased and likewise an increase in pressure is produced.

The heat accumulator 100 also has third storage elements 112 for storing thermal energy, which are arranged in the outlet passage 109.

FIG. 2 shows a further embodiment given by way of example of the heat accumulator 100, which has the same features as the heat accumulator 100 from FIG. 1. In FIG. 2, the diffuser portion 105 is represented with two diffuser angles α and β. In the first region 107, the diffuser portion 105 has an opening angle or diffuser angle β and, in the second region 108, the diffuser portion 105 has a further opening angle or diffuser angle α. The diffuser angle β and the diffuser angle α may be equal. In the embodiment given by way of example in FIG. 2, the diffuser angle β is much steeper, for example 60° to 80°, than the shallower diffuser angle α of the second region 108. The diffuser angle α has for example an opening angle of 10° to 30°.

Consequently, the distribution of the inflowing or outflowing fluid is achieved with a smaller pressure loss.

In a further embodiment given by way of example, the nozzle portion 111 may also be formed in a way corresponding to the diffuser portion 105, for example a first region of the nozzle portion 111 being flatter or having a smaller taper than a second region of the nozzle portion 111 that is situated downstream from the first region and has a greater nozzle angle or a greater taper.

FIG. 3 shows a representation given by way of example of the inlet passage 103. In FIG. 3, in particular, the first region 107 of the diffuser portion 105 is represented. The working fluid flows through the inlet opening 104 of the inlet passage 103 into the first region 107. The first region 107 has a wall of a conical shape, the flow cross section increasing from the inlet opening 104 along the flow direction (see arrows).

For clarification of the diffuser portion 105, the diffuser angle α is represented. The diffuser angle α is determined for example between the shape of the wall of the diffuser portion 105 and a center axis or a parallel line (see dashed line in FIG. 3) with respect to the center axis.

The diffuser portion has a diffuser angle of (approximately) 45° to 60°.

It should additionally be pointed out that "comprising" does not exclude other elements or steps and "a" or "an" does not exclude a plurality. Furthermore, it should be pointed out that features or steps that have been described with reference to one of the exemplary embodiments given above can also be used in combination with other features or steps of other exemplary embodiments described above. Reference signs in the claims are not to be considered as being restrictive.

The invention claimed is:

1. A heat accumulator, having a housing, said housing have a width with a substantially constant cross section, first storage elements for storing thermal energy, the first storage elements being arranged in the housing, and an inlet passage, which is coupled to the housing in such a way that a working fluid can flow into the housing through the inlet passage, the inlet passage having an inlet opening, through which the working fluid can flow into at least one diffuser portion of the inlet passage from an area surrounding the heat accumulator, the at least one diffuser portion including a first region and a second region, and said first region having a wall which across its entire length has a flow cross section that gradually becomes greater at a diffuser angle β, wherein said diffuser angle β is defined between a center axis of the inlet passage and the wall of the diffuser portion and where the diffuser angle β is further defined at where inlet passage connects to the diffuser portion whereby the diffuser portion produces a combination of a distributing effect of the working fluid and a gradual pressure loss of the working fluid, wherein the first region does not have any storage elements, said second region having a wall which across its entire length has a flow cross section that gradually becomes greater at a diffuser angle α that is less than the diffuser angle β, wherein said diffuser angle α is defined between the center axis of the inlet passage and the wall of the diffuser portion and where the diffuser angle α is further defined at where the diffuser portion connects to the housing, the second region having second storage elements therein configured for distributing the flow of the working fluid, and wherein the wall of the first region directly merges with the wall of the second region, wherein the first storage elements are of a different type than the second storage elements.

2. The heat accumulator as claimed in claim 1, the diffuser portion having a diffuser angle of 45° to 60°.

3. The heat accumulator as claimed in claim 1, the first storage elements comprising stones, wherein the stones are lava stones, granite or basalt.

4. The heat accumulator as claimed in claim 3, also having an outlet channel, which is coupled to the housing in such a way that the working fluid can flow out of the housing through the outlet channel.

5. The heat accumulator as claimed in claim 4, the outlet channel having an outlet opening, through which a further working fluid can flow out of the housing out of the outlet channel, and the outlet channel having a nozzle portion, which has a flow cross section that becomes smaller along a direction from the housing to the outlet opening.

6. The heat accumulator as claimed in claim 5, also having further storage elements for storing thermal energy, which are arranged in the outlet channel.

7. A steam power plant for generating electrical energy, the steam power plant having the heat accumulator as claimed in claim 1.

8. The heat accumulator of claim 1, wherein the first region is free of the second storage elements.

9. The heat accumulator of claim 8, wherein the diffuser angle α is 10° to 30°.

10. The heat accumulator of claim 8, wherein the diffuser angle β is 60° to 80°.

11. The heat accumulator of claim 1, wherein the first region is configured exclusively to reduce the flow rate of the working fluid and for distributing the working fluid.

12. A method for storing thermal energy, the method comprising:

flowing a working fluid through an inlet passage into a housing of a heat accumulator, the heat accumulator having the housing and first storage elements for storing thermal energy, the first storage elements being arranged in the housing, the inlet passage having an inlet opening, through which the working fluid can flow into the inlet passage from an area surrounding the heat accumulator, and the inlet passage having a diffuser portion including a first region and a second region, wherein the first region which has a wall having a flow cross section that becomes greater along a direction from the inlet opening to the housing, wherein said first region has a diffuser angle β which is defined between a center axis of the inlet passage and the wall of the first region, said second region has a wall having a flow cross section that becomes greater at diffuser angle α that is less than the diffuser angle β, wherein said diffuser angle α is defined between the center axis of the inlet passage and the wall of the second region, said inlet passage having second storage elements therein configured for distributing the flow of the working fluid, and wherein the wall of the first region directly merges with the wall of the second region, wherein the first storage elements are of a different type than the second storage elements, and wherein the first region does not have any storage elements.

13. The method of claim 12, further comprising reducing the flow rate and distributing the working fluid with the first region.

* * * * *